Jan. 16, 1968     A. M. BRENNEKE     3,363,612

SELF-SUPERCHARGED ENGINE WITH CONSTANT PRESSURE ACCUMULATOR

Filed Sept. 3, 1965     3 Sheets-Sheet 1

Inventor:-
Arthur M. Brenneke,
By Hofgren, Wegner, Allen,
Stellman & McCord Attys.

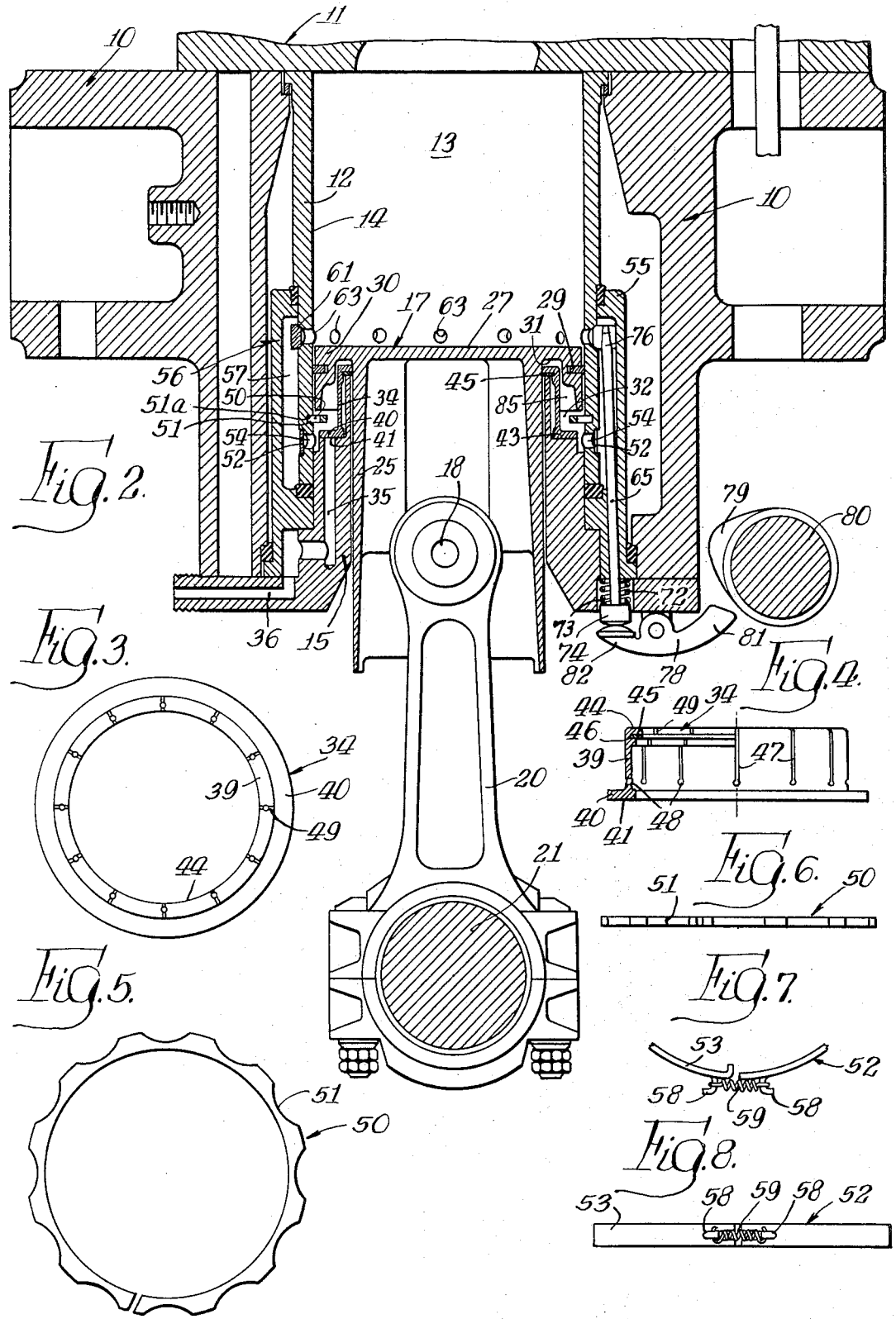

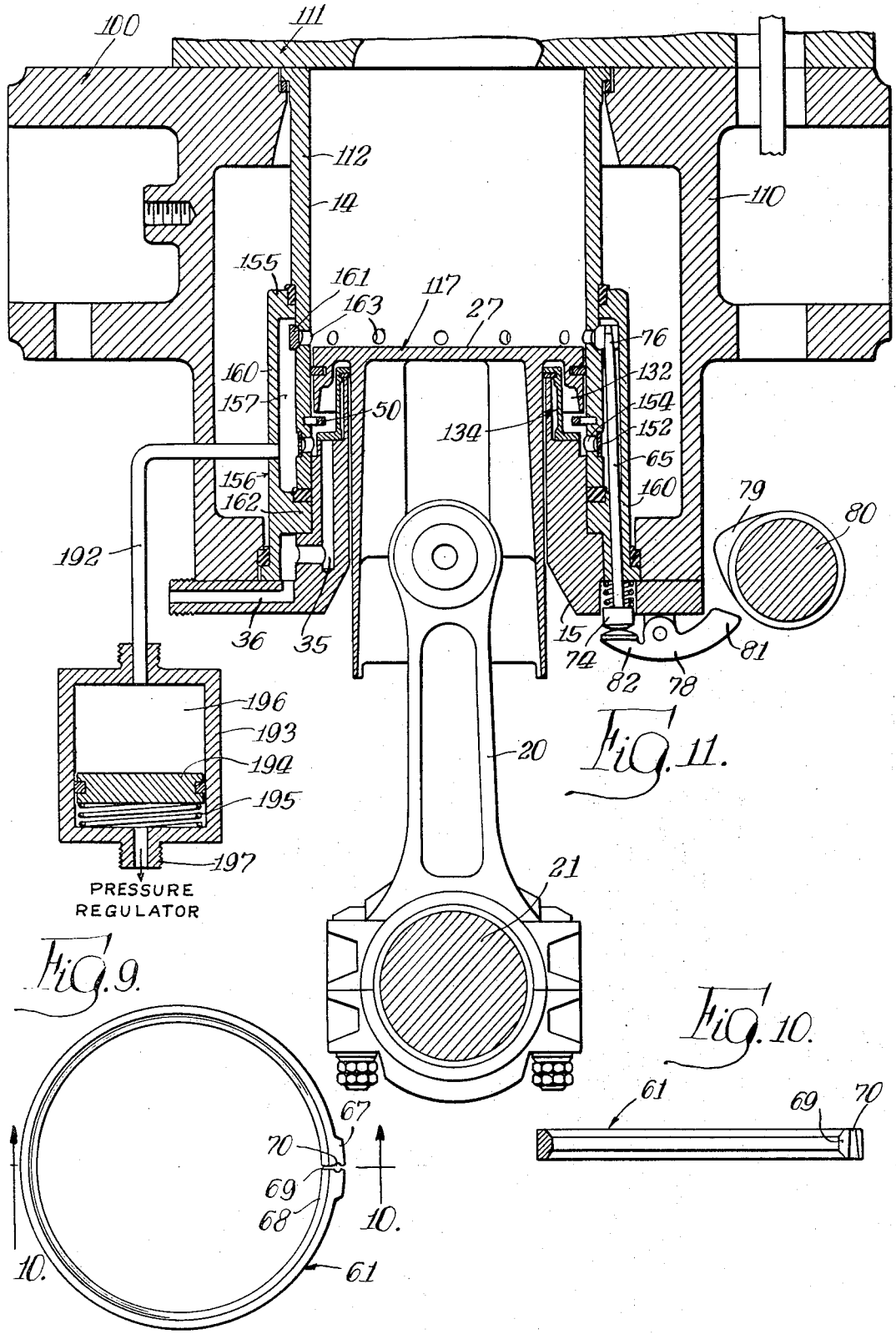

United States Patent Office 3,363,612
Patented Jan. 16, 1968

---

3,363,612
SELF-SUPERCHARGED ENGINE WITH CONSTANT PRESSURE ACCUMULATOR
Arthur M. Brenneke, 923 Maplewood Drive,
New Castle, Ind. 47362
Filed Sept. 3, 1965, Ser. No. 484,966
9 Claims. (Cl. 123—76)

ABSTRACT OF THE DISCLOSURE

This invention is directed to an engine having a self-supehcharging means associated therewith. In one form of the invention, each piston is provided with an air compressor portion, which portion communicates with an accumulator constructed integrally within the confines of the engine. Valving means are provided for permitting ingress of atmospheric air into the compressor where it is compressed and admitted to the accumulator through preset valves. The compressed air is stored in the accumulator until admitted by separately actuated valves during the intake cycle of the four-cycle operation of the engine. Added features relate to using either a constant pressure accumulator or a constant volume accumulator and to a valve stem actuated valve for use in admitting compressed air to the combustion chamber of the engine.

---

This invention relates to a self-supercharged internal combustion engine.

It is an object of this invention to provide a novel internal combustion engine in which the working cylinder and piston are designed to serve their normal function of transmitting forces to the crankshaft and also serve as a piston type compressor to supply high pressure air for a variety of purposes.

A further object of this invention is to provide in an internal combustion engine twice the normal volume of combustion air for any given working displacement, with no increase in external over-all engine dimensions and without the addition of costly, complicated or ciritical parts.

Another object of this invention is to provide such an air compressor together with valve means to provide for supercharging or afterburning in an internal combustion engine, or both.

Still another object of this invention is to provide a self-supercharged internal combustion engine with no increase in the external over-all dimensions of a conventional engine and with the addition of a minimum of parts.

Still a further object of this invention is to provide a self-supercharging feature for an engine having either an integral cylinder liner or a separate cylinder liner.

It is still another object of this invention to prevent combustion blow-by gases from reaching the engine crankcase by diverting and reingesting such gases into the combustion cycle.

And still another object of this invention is to provide an improved engine having a constant volume accumulator thereon.

A still further object of this invention is to provide an improved engine having a constant pressure variable volume accumulator thereon.

Other objects and advantages of the invention will be apparent from the following description taken in conjunction with the accompanying drawings in which:

FIG. 2 is an elevation view in section showing the relative position of the parts at the bottom of the piston's stroke;

FIG. 3 is a plan view of the first or intake valve means of the invention;

FIG. 4 is an elevation of the valve means of FIG. 3;

FIG. 5 is a plan view of the intake valve stops;

FIG. 6 is an elevation of the valve stop of FIG. 5;

FIG. 7 is a partial plan view of the second valve means of the invention;

FIG. 8 is an elevation of the valve means of FIG. 7;

FIG. 9 is a plan view of the third valve means of the invention;

FIG. 10 is an elevation view taken along line A—A of FIG. 9; and

FIG. 11 is an elevation view in section through an engine including a schematic showing of a modified form of the invention.

Figure 1:
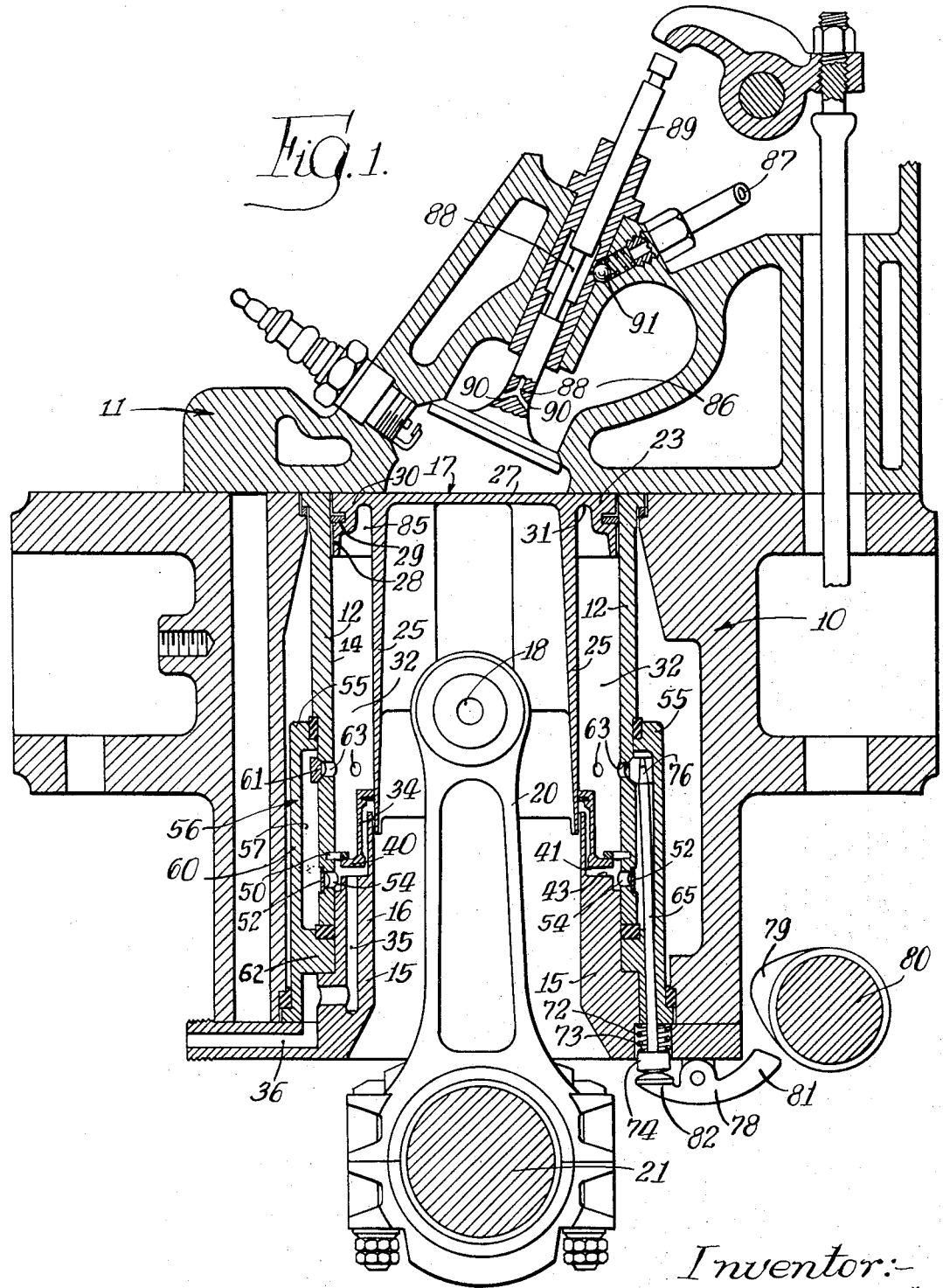
FIG. 1 is an elevation view in section through an engine embodying the invention and shows the relative position of the parts at the top of the piston's stroke.

This invention contemplates the use in an internal combustion engine of the lower half of a cylinder and underside of a piston as a compressor by means of a two diameter stepped piston and cylinder. More particularly, by providing a cylinder having a reduced diameter lower portion and a piston slidable therein having a reduced diameter portion, an air compressor can be created. It can be seen that by having the larger head portion of the cylinder of a standard diametrical dimension and using a reduced diameter portion away from the head as a part of the air compressor, a standard size cylinder opening can be employed without in any way increasing the overall engine dimensions. The novel compressor can be added to an engine which has either a separate cylinder liner or an integral cylinder liner without departing from the spirit of the invention.

The use of the novel compressor arrangement with either a constant volume accumulator or a constant pressure accumulator produces an improved combination of parts wherein many advantageous features of engine operation can be accomplished by making use of the availability of a source of compressed air on the engine. Specifically, the compressed air can be used to reduce the bad effects of exhausting incomplete products of combustion, can be used in supercharging the engine and/or can be used as an element of engine control resulting in improved fuel economies.

Referring to the drawings in greater detail, FIG. 1 shows a section through one of the cylinders of a preferred form of a self-supercharged internal combustion engine, embodying one form of the invention and comprising a cylinder block 10, a cylinder head 11 and a pan or crankcase, not shown. Seated in the cylinder block 10 is a cylinder liner 12 which defines a cylinder 13 (FIG. 2) having a large diameter upper portion 14 (FIG. 2) which forms the main or working cylinder. A supplemental cylinder liner or bushing 15 is nested in the lower part of the cylinder liner 12 and in and against the lower part of the cylinder block 10 and defines a smaller diameter lower cylinder portion 16.

A double surface piston 17 is adapted to be reciprocated in the cylinder 13 and is pivotally connected at 18 to a piston rod 20 appropriately connected to a crankthrow 21 of a crankshaft of the engine. The piston 17 has a large diameter portion 23 sliding in the large diameter upper portion 14 of the cylinder, and a reduced diameter portion 25 sliding in the smaller diameter lower portion 16 of the cylinder. The large diameter portion 23 of the piston 17 has a working surface 27 facing into the combustion chamber and has a downwardly directed flange 28 around the outer edge of the working surface 27. The flange 28 has an outer surface and an inner surface with the outer surface operatively supporting the piston rings 29 and the inner surface defining a wall spaced from the vertical surface of the reduced diameter portion 25 of the piston 17. The underside 30 of the working surface 27 that extends between the reduced diameter portion 25 of the piston and the wall of the flange 28 is hereinafter referred to as the air compressor piston 31 and defines one end of an air compressor or compression chamber 32.

The reduced diameter portion 25 of the piston 17 and the air compressor piston 31 thus form an air compressor which can produce air under pressure for supercharging the engine or for other purposes. As an example, by reducing the diameter of the piston 14 by approximately three tenths (0.3) of the radius thereof, a compressor volume of approximately one-half the volume of the working cylinder can be produced.

FIG. 2 shows a section through one of the cylinders of my self-supercharged internal combustion engine wherein the piston it at the bottom of its stroke.

Several individually operative valves are provided for controlling the flow of air during the engine operation. A first or intake valve 34 of the check valve type is provided for controlling the air passing into the compression chamber 32 through intake ports 35 as shown in FIGS. 1 and 2. The intake ports 35 are connected through appropriate porting 36 and connections with a source of air generally external of the engine and at atmospheric pressure. The intake valve 34 has a cylindrical body portion or wall 39 connected at its lower end to an annular plate 40 having an exposed, downwardly facing planar valve or seating surface 41 adapted to seat on a shoulder 43 formed on the end of the supplemental cylinder liner 15 through which the intake port 35 extends. It can be seen in FIG. 2 that the outwardly extending plate 40 seals off the intake ports 35 during the downward stroke of the piston 17 to stop the flow of air through said intake ports 35.

The upper radially inwardly extending flange 44 of the body portion 39 of the intake valve 34 carries a contracting seal 45 nested in an internal groove 46 formed in said inwardly extending flange 44. The seal 45 must be expanded with said flange 44 when installed around the piston 25 and exerts a contracting and sealing force on the surface of the piston 25. As shown in FIGS. 3 and 4, a spring characteristic is imparted to the flange portion 44 of the valve by means of the axial slits 47 which begin with the transverse holes 48 in the walls 39 an dextend through the radial slots 49 in the upper flange 44. Due to the slotted nature of the body 39 of the valve, the body is somewhat flexible and can be expanded along with the seal 45. During the upward stroke of the piston, the annular plate 40 of the valve 34 is raised (as seen in FIG. 1) with the piston 17 until the top surface of the plate 40 abuts a stop 50 carried by the cylinder liner 12 to draw air through the intake ports 35, 36 into the compression chamber 32. The stop 50 is shown in FIGS. 5 and 6 as having fluting or convolution 51 around its outer periphery such that the ends of the flutes will nest in the groove 51 to form openings between the liner 12 and the base of the convolutions through which the incoming air can pass when the flange 40 of the valve is against the stop 50.

Downward movement of the piston 17 seats not only the seal 45 onto the end of the liner 15, but also seats the face 41 of the flange 40 onto the ports 35 thereby preventing air in the compression chamber from escaping back past the valve 34. By having the contracting seal 45 of the valve 34 engaging with the walls of the piston 25 to raise and lower the compressor intake valve 34, mechanical opening and closing of the intake ports 35 and the passageway beside the piston 25 is provided. This insures much higher volumetric efficiency for the compressor than if the valve had to be opened by pressure of the incoming air. The over-all engine cycle efficiency depends largely on the efficiency of the compressor. The short axial travel of the intake valve 34 assures instantaneous opening and closing the intake ports 35 with a high degree of reliability.

A second or compressor exhaust valve 52 shown in some detail in FIGS. 7 and 8 is provided in the form of an annular band 53 and is of the check valve type. The valve 52 controls the radial exhaust ports 54 which lead from the compressor 32 to an accumulator 56 around the outer periphery of the cylinder liner 12. The valve 52 has a pair of ears 58 extending from the end portions of the opposite ends of the band 53 between which ears is stretched a spring 59. With the band 53 encircling the liner 12 in overlapping relation to the ports 54, the spring 59 seats the valve according to a predetermined pressure such that when the pressure in the compressor 32 exceeds said predetermined pressure, the spring 59 will permit the valve 52 to open and air to enter the accumulator 56. The accumulator 56 is formed by inserting a sleeve 60 in the cavity between the cylinder liner 12 and the cylinder block 10. A top radial flange 55 and a bottom radial flange 62 are formed on the sleeve 60 and engage with the cylinder liner 12 in sealing relationship with said cylinder to define the accumulator chamber 56. Appropriate seals are provided between the accumulator, the cylinder liner and the engine block to maintain the chambers sealed from each other.

A third or accumulator exhaust valve 61 of the band type is disposed in said accumulator 56 to control the flow of air from the accumulator 56 into the combustion chamber or large diameter chamber 13 through the liner 12 by means of the ports 63 when the large diameter portion 23 of the piston is below said ports 63. In a four-cycle engine this would be at the end of the intake stroke or at the beginning of the exhaust stroke of the piston.

Since the compressor 32 changes the accumulator 56 every downward stroke of the piston in a four-cycle engine, and since it may be desirable to admit high pressure air into the working cylinder at the beginning of the exhaust stroke and/or at the end of the intake stroke, means must be provided to open the third valve 61 during predetermined portions of the strokes of the piston. A means shown in FIGS. 1 and 2 has been provided wherein a plunger 65 is provided to cotrol the opening of the third valve 61 during predetermined parts of the piston strokes. The third valve 61 consists of a jointed band 66 and is best shown in FIGS. 9 and 10 in which the band is illustrated with enlarged end portions 67, 68 which meet at a break or joint 69 which is provided with a generally conically shaped opening 70 at the plunger contacting side of the band. The plunger 65 is normally urged downwardly by a spring 72 (FIG. 1) exerting pressure against the shoulder 73 on the plunger head 74 and against the end of the cylinder block. The plunger 65 has a conically shaped end 76 adapted to nest in the conically shaped opening 70 in the band 66 of the valve 61. A rocker arm 78 is provided for engagement with the plunger head 74. A cam 79 connected to the engine cam shaft 80 rotates to strike one end 81 of the rocker arm 78 causing the other end 82 to move the plunger 65 upward into the conical opening 70 in the joint 69 of band valve 61, thus spreading the joint and opening said band valve 61. Any desired timing of the opening of the valve 61 may be obtained, depending on whether cam 79 is the exhaust cam or the intake cam of the engine. The exact timing of valve 61 may be further adjusted by designing the rocker arm 78 to be contacted by a cam at any desired angular position within its bottom 180° of rotation.

The following is a description of the operation of this form of the invention as applied to a four-cycle internal combustion engine wherein the high pressure air is used for afterburning purposes to eliminate unburned hydrocarbons from the exhaust of the engine in the interest of avoiding pollution of the atmosphere. During the compression stroke of the working cylinder, valve 34 opens and the compression chamber 32 is filled with air through port 35, valve 34 closes as the power stroke begins, and when the air is compressed enough to raise the pressure sufficient to open the valve 52, the air is discharged into the accumulator 57. As the large diameter portion 23 of the piston 17 passes below ports 63, the air may be admitted into the working cylinder by means of the third valve 61 being opened in timed relation by the cam 79, rocker 78 and plunger 65. During the exhaust stroke of the working cylinder, the compression chamber 32 is filled again by way of ports 35, and the unseated first valve 34.

If it is desired to use the high pressure air to supercharge and increase the power output of the engine, the timing of the opening of the third valve 61 can be arranged to open at the bottom of the intake stroke of the working cylinder. During the fourth (intake) stroke, the compression of air in the compression chamber 32 is repeated and air is discharged into the accumulator 56 whereupon a supply of high pressure air may again be admitted into the working cylinder. This latter timing arrangement, in the case of a throttled intake, spark ignition engine; offers the possibility of stratifying the total intake charge so that a rich mixture exists near the spark plug and a layer of pure air lies on top of the piston. It is well known that such stratification makes it possible to operate the engine at very high air fuel ratios. This is desirable because it reduces unburned fuel in the exhaust and improves fuel economy. In addition, ports 63 can be drilled tangentially to give swirl to the intake air charge, thereby promoting stratification. In diesels, swirl is desirable to help break up the concentrated fuel spray from the injector and mix it throughly with the air.

As stated above, it may be desirable to admit air to the working cylinder only during every fourth stroke, every other stroke or both. In either case, the above described plunger means 65 and cam 79 can be employed.

This invention prevents the passing of blow-by gases from the combustion chamber to the crankcase of the engine. It can be seen that any blow-by gases which pass the working cylinder piston are trapped in the compressor chamber 32, are compressed, are forced into the accumulator and reingested in the following combustion cycle. Thus the need for normally troublesome crankcase ventilating systems designed to return blow-by gases to the combustion chamber is eliminated.

In one embodiment of my invention, the displacement of the compressor 32 is approximately equal to one-half the displacement of the working cylinder. By decreasing the stroke or increasing the bore of the working cylinder, it can be seen that the ratio of compressor displacement could be further increased. Likewise, the ratio may be reduced by reducing the difference between the piston and cylinder diameters.

The following description will show how a conventional engine design can be adapted to facilitate the unique over-all design of the present invention and result in no increase in the external over-all engine dimensions and with the addition of a minimum of parts. It should be made clear that the cooperation, combination, and details of construction of the various parts described is but a preferred embodiment to illustrate but one method of adapting this invention to a standard cylinder block. As shown in FIGS. 1 and 2, a standard cylinder block 10 has been provided therein, the sleeve or cylinder liner 12 having ports 54 and 63 therethrough. Valves 34 and 61 are disposed about the outer surface of the liner 12 to control the ports 54 and 63. It can be seen that the liner 12 forms the large diameter upper portion 14 of the cylinder. The supplemental liner 15 having air intake ports 35 and 36 therethrough, is fitted against the lower ends of the cylinder liner 12 and the cylinder block 10 and forms the reduced diameter lower portion 16 of the cylinder. The first valve means 34 is fitted to seat against the upper portion 43 of the liner 15 to control the air intake ports 35.

The larger diameter sleeve 60 is fitted against the cylinder liner 12 at one end and against the supplemental liner 15 and cylinder block 10 at the other end and is located between the cylinder liner and the cylinder block wall to form the surrounding accumulator chamber 56. The double surface piston 17 is slidable in the resulting reduced diameter cylinder forming an air compressor means. The lower surface 31 of the double surface piston 17 has an annular groove 85 into which the cylindrical body 39 of the annular valve 34 and the upper portion of the supplemental sleeve linear 15 can extend when the piston 17 is at the bottom of its stroke. The groove or clearance 85 is provided so that a minimum volume is maintained in the compression chamber 32 at the bottom of the piston stroke. Thus it can be seen that a conventional cylinder block 10 having a standard cylinder cavity 14 can be adapted by this arrangement to form an embodiment of this invention. Many alternative arrangements such as placing an accumulator external to the engine, casting an accumulator and cylinder liner integral with the block, and the like, are posible within the scope and spirit of this invention.

From the above it should now be clear that the arrangement of the working cylinder on the upper part of the piston with the air compressor on the lower and smaller part of the piston makes it possible to maintain the present engine construction and size without varying the throw of the piston. In addition, in engines either with or without separate cylinder liners, a supplemental liner for the air compressor can be readily attached to the conventional block to adapt an engine to my improved supercharging or air compressing and accumulator feature on an engine together with all of the advantages incident thereto.

The modification shown in FIG. 11 is illustrated partially in cross section and partially in diagrammatic view. Hereinbefore, I have described a constant volume accumulator 56 and the relationship between the volume of the compressor 14 and the volume of the accumulator 56. As a modification of my invention a constant pressure, variable volume accumulator 156 is shown in FIG. 11 installed on an engine 100 having an engine or cylinder block 110, a cylinder head 111 and a cylinder liner 112. The organization of the large and small diameter cylinders with the multi-surface piston 117, together with the compressor 132, the valves 134, 152 and 161, and the mode of operation of the engine, is the same as the form of my invention illustrated and described in FIGS. 1–10 and does not need to be repeated here in detail.

The constant pressure accumulator 156 is sealed to the outside of the cylinder liners 112 and 115 by means of the top radial flange 155 and the bottom radial flange 162 on the cylindrical body 160 engaging with gaskets and being secured thereto in such a way as to seal the chamber 157 from the other parts of the engine block. The valves 152 and 161 close the ports 154 and 163 that communicate between the accumulator and both the compressor 132 and the working portion of the upper cylinder 114, respectively.

Diagrammatically shown, communicating with the acculator by means of piping 192, is a pressure chamber 193 in which is movably mounted a piston 194. The piston 194 is urged by means of a spring 195 toward the pressure end 196 of the chamber 192. The spring 195 can be calibrated to require a predetermined load on the piston to compress it. A pressure regulator (not shown) is connected at 197 to the spring side of the chamber 193 whereby a predetermined pressure can be established in the pressure end 196 of the chamber, if desired. Either together or separately the spring 195 and the pressure regulator can be used to establish a constant pressure variable volume accumulator. Air from the compressor 132 will be forced into the accumulator chambers 157 and 196 through valve 152. The constant pressure air in the accumulator chambers 157, 196 will be admitted to the cylinder through valve 161 during a predetermined part of the cycle.

With the predetermined constant pressure established, the engine is started, whereupon every down stroke of the piston 117 will force a predetermined volume of air from the compressor 132 into the accumulator chambers 157 and 196. As soon as the pressure in the accumulator 156 reaches the predetermined level (for instance, 50 p.s.i.), the spring 195 and/or regulator 197 will permit the piston 194 in the chamber 193 to move downward thereby keeping the pressure constant, but enlarging the volume of the accumulator 156. When the accumulator 156 is exhausting into the working cylinder or the like, the spring 195 and piston 194 will urge the air out of the accumulator 156 under constant maximum pressure until the piston reaches its extreme position. Under certain modifications it may be important to reduce the volume of the chamber 156 to a minimum and enlarge the volume of the chamber 193, whereupon the fluid in the accumulator will be more completely discharged each time. Minimizing the space in the accumulator to only working space will permit the accumulator to operate at a greater efficiency since no wasted space need by filled with air under pressure.

The constant pressure air in the accumulator can be used as described hereinbefore either for supercharging, cooling, reducing incomplete combustion and the like.

The piston 194 can be either spring loaded or pressure loaded to maintain the constant pressure in the chambers 157, 196. The spring should of necessity be the type that produces constant load throughout its full range of deflection. With a calibrated spring the piston 194 could maintain any desired pressure.

While the design shown in all of the modifications in the drawings is based on a single cylinder adaptation, it is anticipated that several accumulators such as 56 may be interconnected or one common accumulator may be used in the case of multi-cylinder engines. In addition, the use of an accumulator makes available an auxiliary air supply independent of the timing of the piston in the working cylinder.

If it is desired to either supercharge the engine or afterburn the unburned hydrocarbons, it can be seen that the working cylinder would only require an intake charge every fourth stroke while the compressor chamber takes in a charge of air every other stroke. Thus the air compressor could supply a volume of air to the working cylinder equal to that which is naturally aspirated through the conventional intake port and poppet valve.

With a volume of high pressure air added to the working cylinder, the carbureted fuel air ratio may be much higher than normal, an increased air fuel ratio contributes to clean combustion and reduction of both unburned hydrocarbons and other undesirable products in an engine exhaust.

The described operation of the invention as applied to a four-cycle engine is but one embodiment of the invention. Since the basic concept consists of two separate and independent sources of air, one of them at high pressure, it is possible to use the latter at a variety of points in the four-cycle sequence of the working cylinder. The availability of high pressure air, independent of the conventional combustion air system and without size penalty to the engine, can obviously fulfill a great variety of other useful purposes.

In FIG. 1 is shown a feature wherein air under pressure can be supplied to an exhaust valve port 86 of such an engine. Ports 63, valve 61 and the plunger operating mechanism 65 can be eliminated so that air under pressure is supplied to the exhaust valve port from the accumulator 56 by a conduit 87 and flows through intervening ports to a longitudinal passage 88 in a valve stem 89, and through radial exit ports 90. A ball check valve 91 operated by movement of the valve stem 89 is provided in the air supply passage and is closed in the position shown. When the exhaust valve opens, the ball check valve 91 is opened to admit the incoming air. By so timing the ball check valve 91, the high pressure supply of air produced by the compressor means of this invention can be injected as described above in timed relation to the movement of the exhaust valve to provide for afterburning in the exhaust passage. It can be seen that by admitting air as close to the exhaust valve seat as possible, more complete combustion can be accomplished by the disclosed construction. Such a construction would also provide a means for cooling the exhaust valves.

While the high-output (supercharging) at a low cost feature of this design has great potential, the current problem of exhaust and crankcase emission is critical. The attractiveness of offering an integral air source at no space penalty and eliminating external gadgetry is further enhanced by the possibilities of using the admitting high pressure air for afterburning purposes to completely burn the original fuel and air charge in the cylinder during the latter part of the combustion cycle, in the exhaust port or in the manifold.

The fact that supercharging of a carbureted engine may be greatly simplified by such a supply of compressed air completely independent of the naturally aspirated air, should not overshadow the great variety of new approaches opened up by the dual air supply inherent in this concept. This invention, which makes high pressure air almost a by-product of engine operations, offers great potential in the field.

While specific details of construction and specific steps of operation have been referred to in describing this invention, it will be understood that many variations can be resorted to within the spirit of the invention.

I claim:

1. For use in an internal combustion engine having a cylinder block with a cylinder bore; a sleeve liner adapted to fit in said bore forming a large diameter combustion chamber portion of a cylinder; a bushing adapted to fit in part in the lower end portion of said sleeve liner, said bushing having a cylindrical bore forming a reduced diameter portion of said cylinder; an annular surface between said large diameter portion and said reduced diameter portion of said cylinder; a sleeve surrounding and spaced outwardly from said sleeve liner to form an annular accumulator chamber; a double surface piston having a head end surface portion slidable in said large diameter combustion chamber portion of said cylinder and a reduced diameter surface portion spaced from the head end surface portion and slidable in said reduced diameter portion of said cylinder, said head end surface portion being radially spaced from and partially overhanging said reduced diameter surface portion to provide an annular groove therebetween into which an overhanging end of said bushing extends, an air compressor chamber formed by the annular space between the large diameter portion of the cylinder and the reduced diameter surface portion of the piston and the axial space between the annular surface of the cylinder and the annular groove of the piston; a plurality of air inlet ports provided in said bushing and leading to said air compressor chamber; a first valve means in the form of an annular plate check valve fitted against the air inlet ports in said bushing for controlling said air inlet ports; a plurality of radial exhaust ports formed in said sleeve liner communicating between said accumulator chamber and said air compressor chamber, said exhaust ports being located below the head end surface portion of said piston when said piston is at the bottom of its stroke; a second valve means in the form of an annular band check valve located in said accumulator chamber in operative relation with said exhaust ports for controlling said radial exhaust ports; a plurality of return ports formed in said sleeve liner leading from said accumulator chamber to said large diameter combustion chamber portion, said return ports being located above the head end surface portion of said piston when said piston is at the bottom of its stroke; a third valve means in the form of an annular band located in said accumulator chamber in operative relation with said return ports for controlling said return ports; and means adapted to be actuated by the cam shaft of said engine for opening said third valve means periodically to supply an amount of high pressure air from said accumulator chamber to said large diameter combustion chamber portion of the cylinder.

2. An internal combustion engine as in claim 1 wherein said third valve means is provided with an open joint; and said means for opening said third valve means during a predetermined stroke of said piston takes the form of a spring urged plunger, said plunger being normally urged out of engagement with said third valve means, said plunger being adapted to be moved by the cam shaft of said engine into the joint of said valve means to periodically open said valve means.

3. An internal combustion engine comprising: a cylinder having a large diameter portion at the combustion end having a reduced diameter portion at the other end; a piston slidable in said cylinder and having a head end in said large diameter portion and having a reduced diameter portion spaced from said head end sliding in said reduced diameter portion of said cylinder and forming an annular piston surface therebetween; an air compressor chamber below said annular piston surface; a plurality of air inlet ports leading to said air compressor chamber; a first valve means in the form of an annular plate check valve for controlling said air inlet ports; an accumulator; a plurality of radial exhaust ports leading from said air compressor chamber to said accumulator; a second valve means in the form of an annular band check valve for controlling said radial exhaust ports; a plurality of ports leading from said accumulator to the combustion end of the cylinder at a level above said piston when said piston is at the bottom of its stroke; and third valve means in the form of a band for controlling said last named ports.

4. An internal combustion engine as in claim 3 having means for periodically opening said third valve means to supply high pressure air from said accumulator to said combustion end of the cylinder.

5. An internal combustion engine comprising: a cylinder having a large diameter portion at the combustion end and having a reduced diameter portion at the lower end; a piston slidable in said cylinder and having a head end in said large diameter portion and having a reduced diameter portion spaced from said head end sliding in said reduced diameter portion of said cylinder and forming an annular piston surface therebetween; an air compressor chamber below said annular piston surface; a plurality of air inlet ports leading to said air compressor chamber; a first valve means in the form of an annular plate check valve for controlling said air inlet ports, said first valve means being provided with an annular internal groove therein; a contracting type sealing ring disposed in said groove for contracting sealing engagement with said reduced diameter portion of said piston so that frictional contact between said piston and said ring opens and closes said first valve means; an accumulator; a plurality of radial exhaust ports leading from said air compressor to said accumulator; a second valve means for controlling said radial exhaust ports; a plurality of ports leading from said accumulator to the combustion end of said cylinder; and a third valve means for controlling said return ports.

6. An internal combustion engine comprising: a cylinder having a large diameter portion at the combustion end and having a reduced diameter portion spaced therefrom; a piston slidable in said cylinder and having one end in said large diameter portion and having a reduced diameter portion spaced from said one end sliding in said reduced diameter portion of said cylinder and forming an annular piston surface therebetween; an air compressor chamber communicating with said annular piston surface; means for admitting air to said air compressor chamber; an accumulator; means for controlling the flow of air from said air compressor chamber to said accumulator; means for controlling the flow of air from said accumulator to said combustion end of the cylinder during the intake part of the engine cycle; and means for maintaining constant pressure in said accumulator.

7. An internal combustion engine comprising: a cylinder having a large diameter portion at the combustion end of said cylinder and having a reduced diameter portion at the other end of said cylinder; a piston having portions slidable in said large diameter portion and in said reduced diameter portion, the portion of the piston between said large diameter portion and said reduced diameter portion forming an air compressor means; a constant pressure accumulator means on said engine; means to control the flow of air to the space below said air compressor means; and means to control the flow of compressed air from said space to said accumulator means.

8. An internal combustion engine comprising: a cylinder having a large diameter portion and a reduced diameter portion spaced therefrom; a piston having a head end slidable in said large diameter portion of the cylinder and having a reduced diameter portion slidable in said reduced portion of said cylinder and forming an annular piston surface therebetween opposed to said head end to provide an air compressor means; an air compressor chamber operatively receiving said air compressor means; accumulator means on said engine; means to control the flow of air to said air compressor chamber; means to control the flow of air from said compressor chamber to said accumulator; and means for maintaining the air in said accumulator means at a constant pressure.

9. The engine as in claim 8 and having an exhaust valve; and means for supplying the compressed air from the accumulator means to an exhaust manifold of said engine adjacent the seat of said exhaust valve during predetermined periods of the engine cycle.

References Cited

UNITED STATES PATENTS

| | | | |
|---|---|---|---|
| 1,297,401 | 3/1919 | Ricardo | 123—75 |
| 1,725,418 | 8/1929 | Prindle | 123—76 |
| 1,789,190 | 1/1931 | Noble | 123—74 |
| 3,017,872 | 1/1962 | Candelise | 123—75 X |

FOREIGN PATENTS 16,891    7/1904    Austria.

WENDELL E. BURNS, *Primary Examiner.*

MARK NEWMAN, *Examiner.*